US007889217B2

(12) United States Patent
Sakuma et al.

(10) Patent No.: US 7,889,217 B2
(45) Date of Patent: Feb. 15, 2011

(54) DISPLAY CONTROL APPARATUS AND METHOD, RECORDING MEDIUM, AND PROGRAM

(75) Inventors: Takashi Sakuma, Kanagawa (JP); Masanori Nomura, Tokyo (JP); Hiroshi Nagatani, Tokyo (JP); Haruhiko Sakata, Kanagawa (JP); Hiroyuki Yoshida, Tokyo (JP); Hirooki Tajima, Tokyo (JP)

(73) Assignee: Sony Corporation, Tokyo (JP)

( * ) Notice: Subject to any disclaimer, the term of this patent is extended or adjusted under 35 U.S.C. 154(b) by 102 days.

(21) Appl. No.: 11/224,957

(22) Filed: Sep. 14, 2005

(65) Prior Publication Data

US 2006/0071949 A1     Apr. 6, 2006

(30) Foreign Application Priority Data

Oct. 4, 2004   (JP)   ............................. 2004-291118

(51) Int. Cl.
*G09G 5/02* (2006.01)
(52) U.S. Cl. .................... 345/699; 715/716; 715/717; 715/718; 345/619; 345/660; 345/661; 345/698
(58) Field of Classification Search ................. 345/619, 345/660, 661, 698, 699; 715/716–718
See application file for complete search history.

(56) References Cited

U.S. PATENT DOCUMENTS

| 6,067,071 | A  | * | 5/2000  | Kotha et al. ................. 345/698 |
| 6,222,531 | B1 | * | 4/2001  | Smith ......................... 715/803 |
| 6,538,656 | B1 | * | 3/2003  | Cheung et al. ............... 345/519 |
| 6,549,214 | B1 | * | 4/2003  | Patel et al. ................... 345/660 |
| 6,573,905 | B1 | * | 6/2003  | MacInnis et al. ............. 345/629 |
| 6,760,043 | B2 | * | 7/2004  | Markel ........................ 715/717 |
| 6,788,309 | B1 | * | 9/2004  | Swan et al. ................... 345/629 |
| 7,109,974 | B2 | * | 9/2006  | Kempisty ..................... 345/173 |
| 7,237,185 | B1 | * | 6/2007  | Sequeira ...................... 715/209 |
| 2001/0003454 | A1 | * | 6/2001 | Chambers .................... 345/418 |
| 2002/0089523 | A1 | * | 7/2002 | Hodgkinson ................. 345/660 |
| 2005/0235221 | A1 | * | 10/2005 | Asoh et al. .................... 715/789 |

FOREIGN PATENT DOCUMENTS

JP      11-32272      2/1999

(Continued)

OTHER PUBLICATIONS

ForceWare Graphics Driver User's Guide: Driver Release 60 for Windows; NVIDIA Corporation; Jul. 2004; Ch. 3-7 <http://download.nvidia.com/Windows/61.76/ForceWare_Release_60_Graphics_Display_Property_Users_Guide.pdf>.*

(Continued)

*Primary Examiner*—Michelle K Lay
(74) *Attorney, Agent, or Firm*—Oblon, Spivak, McClelland, Maier & Neustadt, L.L.P.

(57) ABSTRACT

A display control apparatus for controlling display in a first display device that displays a predetermined display range of an entire supplied image is provided. The display control apparatus includes an image scaledown unit adapted to scale down a first image based on a scaledown ratio that is preset in accordance with the size of the display range relative to the entire image; and a display control unit adapted to control display of the first image that is scaled down by the image scaledown unit in the first display device.

7 Claims, 11 Drawing Sheets

FOREIGN PATENT DOCUMENTS

| | | |
|---|---|---|
| JP | 2000-81867 | 3/2000 |
| JP | 2004-194126 | 7/2004 |

OTHER PUBLICATIONS http://en.wikipedia.org/wiki/Overscan.*

Biggs, Billy. "Overscan and broadcast television", http://www.scanline.ca/overscan/; 2003.*

Broberg, David. "Why do modern TV sets have such exaggerated overcan?", http://www.geocities.com/ResearchTriangle/3930/overscan.html?200920; Jul. 12, 1999.*

* cited by examiner

DISPLAY CONTROL APPARATUS AND METHOD, RECORDING MEDIUM, AND PROGRAM

CROSS REFERENCES TO RELATED APPLICATIONS

The present invention contains subject matter related to Japanese Patent Application JP 2004-291118 filed in the Japanese Patent Office on Oct. 4, 2004, the entire contents of which are incorporated herein by reference.

BACKGROUND OF THE INVENTION

1. Field of the Invention

The present invention relates to a display control apparatus and method, a recording medium, and a program. More specifically, the present invention relates to a display control apparatus and method, a recording medium, and a program enabling a user to perform an operation more easily in a dual display environment.

2. Description of the Related Art

Hitherto, a dual display (multi monitor) function of outputting video data from a personal computer (hereinafter referred to as a "PC") to two or more display devices has been known (hereinafter this function is referred to as a "dual display function").

In a typical dual display function, two PC displays (monitors) are used for a PC.

Further, in the typical dual display function, two video cards (graphics boards) or a video card having two video output systems needs to be provided in a PC.

As an example of a technique relating to a video card for the dual display function, Patent Document 1 (Japanese Unexamined Patent Application Publication No. 6-175627) discloses a technique (configuration) of a dual display card that can be used in a computer having a predetermined computer bus, that includes two display channels, and that outputs a video image to two video displays connected to those display channels at the same time.

SUMMARY OF THE INVENTION

However, in a case where the dual display function is used in a PC, one of two display devices connected to the PC being a PC display and the other being a television receiver (TV receiver) such as a cathode ray tube (CRT), different images are displayed on the screens of the PC display and the TV receiver even when the same image is output thereto.

That is, the PC display displays the entire image that has supplied from the PC, whereas the TV receiver displays only part of the image: only a predetermined area from the center of the image supplied from the PC, and does not display areas near upper, lower, right, and left edges thereof. In other words, the upper, lower, right, and left edges of the image that is displayed in the PC display are not displayed in the TV receiver.

This is because an overscan method is used in the TV receiver and an underscan method is used in the PC display. In the overscan method, an image (video image) in a safety area (also called a "safety frame", a "television frame", or a "safety zone") is displayed. In the underscan method, an entire image is displayed.

Furthermore, when an image used as a graphical user interface (GUI), such as icons, is placed near an upper, lower, right, or left edge of an image that is displayed by execution of a predetermined application program, it may be impossible for a user to use all functions of the GUI on the screen of the TV receiver because a peripheral portion of the image is not displayed thereon.

Therefore, the user has an inconvenience when using the application program or operating the GUI on the screen of the TV receiver.

The present invention has been made in view of these circumstances and is directed to display an entire image and enhance the operability of an apparatus.

A display control apparatus according to an embodiment of the present invention includes an image scaledown unit adapted to scale down a first image based on a scaledown ratio that is preset in accordance with the size of a display range relative to an entire image; and a display control unit adapted to control display of the first image that is scaled down by the image scaledown unit in a first display device.

The first image is an image of a graphical user interface, and the display control apparatus may further include a playback unit adapted to play back a second image other than the image of the graphical user interface. The display control unit may control display of the second image in the first display device. When the first image is requested to be displayed from a user in a state where the second image is displayed in the first display device, the display control unit may control display of the first image in the first display device so that the first image is superimposed on the second image.

The image scaledown unit may change the scaledown ratio of the first image in accordance with setting performed by the user.

The display control apparatus may further include a position changing unit adapted to change a position of the first image to be superimposed on the second image in accordance with setting performed by the user.

The display control unit may further control display of a setting image that is displayed in a second display device other than the first display device and that allows the user to set the scaledown ratio and the position of the first image to be superimposed on the second image.

A display control method according to an embodiment of the present invention includes the steps of: scaling down an image based on a scaledown ratio that is preset in accordance with the size of a display range relative to an entire image; and controlling display of the image that is scaled down in the image scaledown step in a display device.

A program recorded in a recording medium according to an embodiment of the present invention includes the steps of: scaling down an image based on a scaledown ratio that is preset in accordance with the size of a display range relative to an entire image; and controlling display of the image that is scaled down in the image scaledown step in a display device.

A program according to an embodiment of the present invention allows a computer to execute the steps of: scaling down an image based on a scaledown ratio that is preset in accordance with the size of a display range relative to an entire image; and controlling display of the image that is scaled down in the image scaledown step in a display device.

According to an embodiment of the present invention, an image is scaled down based on a scaledown ratio that is preset in accordance with the size a display range of an entire image, and display of the scaled down image in a display device is controlled.

Further, according to an embodiment of the present invention, a dual display function can be used. Also, an entire image can be displayed and the operability of the apparatus can be enhanced.

DESCRIPTION OF THE PREFERRED EMBODIMENT

Figure 1:
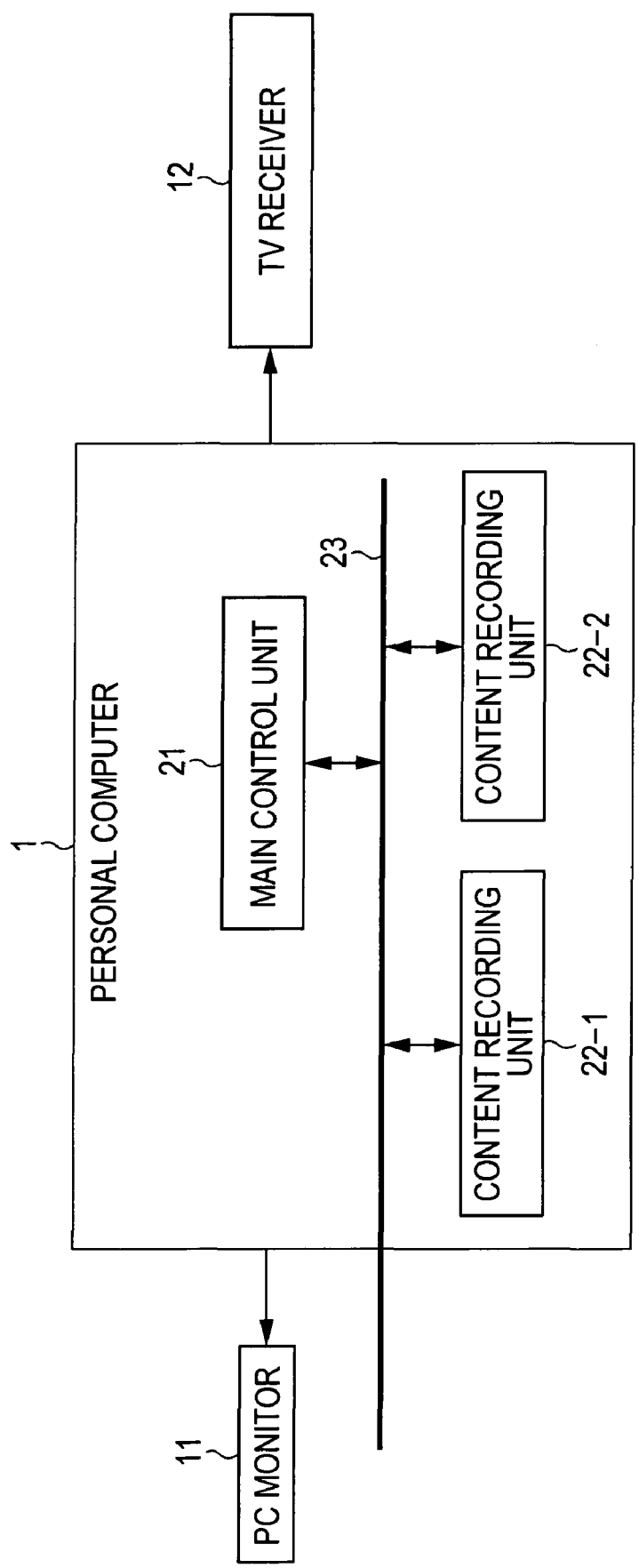
FIG. 1 is a block diagram showing an example of a configuration of a personal computer according to an embodiment of the present invention.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

A display control apparatus according to an embodiment of the present invention is a display control apparatus (e.g., the PC 1 in FIG. 1) for controlling display in a first display device (e.g., the TV receiver 12 in FIG. 1) that displays a predetermined display range (e.g., the safety area 202 in FIG. 6) of an entire supplied image. The display control apparatus includes an image scaledown unit (e.g., the image scaledown unit 151 in FIG. 4) adapted to scale down a first image (e.g., the GUI image 211 in FIG. 7) based on a scaledown ratio (e.g., the value (scaledown ratio) displayed in the menu 271 in FIG. 11) that is preset in accordance with the size of the display range relative to the entire image; and a display control unit (e.g., the display control unit 144 in FIG. 4) adapted to control display of the first image that is scaled down by the image scaledown unit in the first display device.

The first image is an image of a graphical user interface (e.g., the GUI image 211 in FIG. 7), and the display control apparatus may further include a playback unit (e.g., the content playback unit 132 in FIG. 4) adapted to play back a second image (e.g., the image displayed in the safety area 202 in FIG. 6) other than the image of the graphical user interface. The display control unit may control display of the second image in the first display device. When the first image is requested to be displayed from a user in a state where the second image is displayed in the first display device, the display control unit may control display of the first image in the first display device so that the first image is superimposed on the second image (e.g. steps S7 and S3 in FIG. 5).

Figure 10:
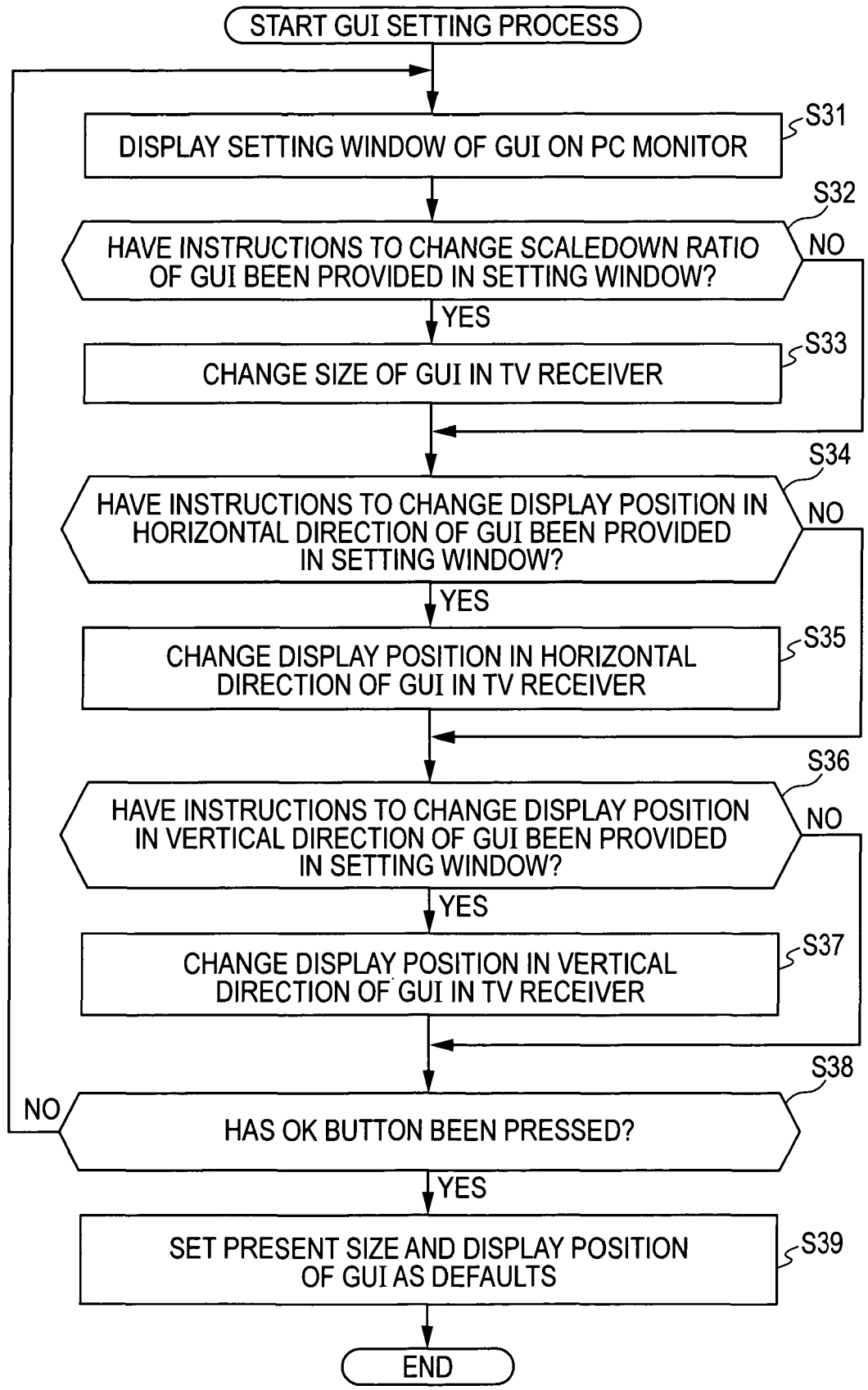
FIG. 10 is a flowchart illustrating a process of setting the GUI.

The image scaledown unit may change the scaledown ratio of the first image in accordance with setting performed by the user (e.g., step S33 in FIG. 10).

The display control apparatus may further include a position changing unit (e.g., the display position changing unit 152 in FIG. 4) adapted to change a position of the first image to be superimposed on the second image in accordance with setting performed by the user.

The display control unit may further control display of a setting image (e.g., the setting window 261 in FIG. 11) that is displayed in a second display device other than the first display device and that allows the user to set the scaledown ratio and the position of the first image to be superimposed on the second image.

A display control method according to an embodiment of the present invention is a display control method in a display control apparatus (e.g., the PC 1 in FIG. 1) for controlling display in a display device (e.g., the TV receiver 12 in FIG. 1) that displays a predetermined display range (e.g., the safety area 202 in FIG. 6) of an entire supplied image. The display control method includes the steps of: scaling down an image (e.g., the GUI image 211 in FIG. 7) based on a scaledown ratio (e.g., the value (scaledown ratio) displayed in the menu 271 in FIG. 11) that is preset in accordance with the size of the display range relative to the entire image (e.g., step S6 in FIG. 5); and controlling display of the image that is scaled down in the image scaledown step in the display device (e.g., steps S7 and S3 in FIG. 5).

A recording medium according to an embodiment of the present invention records a program for controlling display in a display control apparatus (e.g., the PC 1 in FIG. 1) for controlling display in a display device (e.g., the TV receiver 12 in FIG. 1) that displays a predetermined display range (e.g., the safety area 202 in FIG. 6) of an entire supplied image. The program includes the steps of: scaling down an image (e.g., the GUI image 211 in FIG. 7) based on a scaledown ratio (e.g., the value (scaledown ratio) displayed in the menu 271 in FIG. 11) that is preset in accordance with the size of the display range relative to the entire image (e.g., step S6 in FIG. 5); and controlling display of the image that is scaled down in the image scaledown step in the display device (e.g., steps S7 and S3 in FIG. 5).

A program according to an embodiment of the present invention is a program for allowing a computer of a display control apparatus (e.g., the PC 1 in FIG. 1) for controlling display in a display device (e.g., the TV receiver 12 in FIG. 1) that displays a predetermined display range (e.g., the safety area 202 in FIG. 6) of an entire supplied image to control display. The program includes the steps of: scaling down an image (e.g., the GUI image 211 in FIG. 7) based on a scaledown ratio (e.g., the value (scaledown ratio) displayed in the menu 271 in FIG. 11) that is preset in accordance with the size of the display range relative to the entire image (e.g., step S6 in FIG. 5); and controlling display of the image that is scaled down in the image scaledown step in the display device (e.g., steps S7 and S3 in FIG. 5).

Hereinafter, an embodiment of the present invention is described with reference to the drawings.

FIG. 1 is a block diagram showing a personal computer (PC) 1 functioning as a display control apparatus according to an embodiment of the preset invention.

The PC 1 connects to a monitor (display) for a general-purpose PC (hereinafter referred to as a "PC monitor") 11 and to a television (TV) receiver 12 including a cathode ray tube (CRT), a liquid crystal display (LCD), or a plasma display panel (PDP).

The PC monitor 11 displays images output from the PC 1. Also, the TV receiver 12 displays images output from the PC 1.

At this time, the PC 1 is capable of outputting the same image to both the PC monitor 11 and the TV receiver 12 and displaying the image therein. Also, the PC 1 is capable of outputting different images to the PC monitor 11 and the TV receiver 12 and displaying the images therein. Further, the PC 1 is capable of using the screen of the PC monitor 11 and that of the TV receiver 12 as a single monitor screen. That is, the PC 1 is a personal computer having a so-called dual display function.

The PC 1 includes a main control unit 21 and content recording units 22-1 and 22-2. The main control unit 21 and the content recording units 22-1 and 22-2 connect to each other through a network 23.

The type of the network 23 is not specified, for example, Ethernet® can be used. Alternatively, the network 23 can be omitted. That is, the main control unit 21 and the content recording units 22-1 and 22-2 may directly communicate with each other without using the network 23.

Hereinafter, each of the content recording units 22-1 and 22-2 is referred to as a content recording unit 22 when they need not be distinguished from each other.

In the example shown in FIG. 1, two content recording units 22 are mounted in the PC 1, but the number of recording units 22 is not limited to that shown in FIG. 1 and may be arbitrarily set. Likewise, the number of main control units 21 to be mounted may be arbitrarily set.

Figure 2:
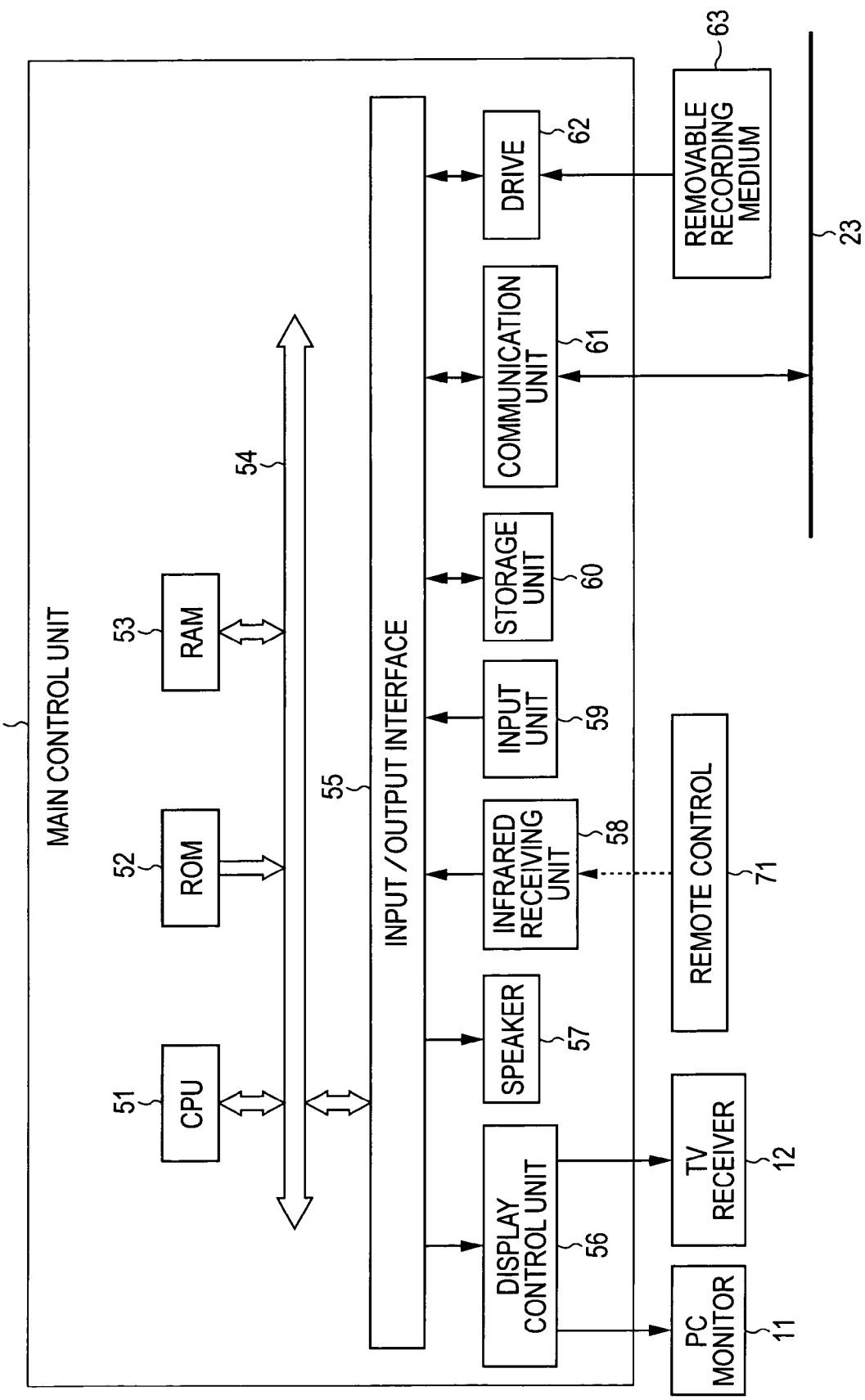
FIG. 2 is a block diagram showing an example of a configuration of the main control unit shown in FIG. 1.

FIG. 2 is a block diagram showing an example of a configuration of the main control unit 21. In the main control unit 21 shown in FIG. 2, a central processing unit (CPU) 51 executes various processes according to a program loaded from a read only memory (ROM) 52 or a program loaded from a storage unit 60 to a random access memory (RAM) 53. The RAM 53 also stores data required by the CPU 51 to execute various processes.

The CPU 51, the ROM 52, and the RAM 53 connect to each other through a bus 54. The bus 54 connects to an input/output interface 55.

The input/output interface 55 connects to a display control unit 56 including a video card (graphics board) having a dual display function, a speaker 57, an infrared receiving unit 58 to receive infrared rays as signals from a remote control 71, an input unit 59 including a keyboard and a mouse, a storage unit 60 including a hard disk or the like, and a communication unit 61 to control a communication with another block (the content recording unit 22-1 or 22-2 shown in FIG. 1) through the network 23.

The display control unit 56 connects to the PC monitor 11 and the TV receiver 12. That is, the display control unit 56 is provided with two output terminals: a video output terminal for the PC monitor 11 and a video output terminal for the TV receiver 12, such as a D subminiature (Dsub) terminal, a digital visual interface (DVI) terminal, a separate (S) terminal, and a detection (D) terminal.

In this embodiment, two output terminals are provided in the display control unit 56 functioning as a single video card. However, two video cards, that is, two display control units 56, may be connected to the input/output interface 55 in order to realize the dual display function. In that case, one of the display control units 56 is connected to the PC monitor 11 and the other is connected to the TV receiver 12.

The communication unit 61 can be connected to another type of network different from that of the network 23.

Further, a drive 62 connects to the input/output interface 55 as necessary. A removable recording medium 63, such as a magnetic disk, an optical disk, a magneto-optical disk, or a semiconductor memory, is loaded thereto, and a computer program or data read therefrom is installed in the storage unit 60 as necessary.

Figure 3:
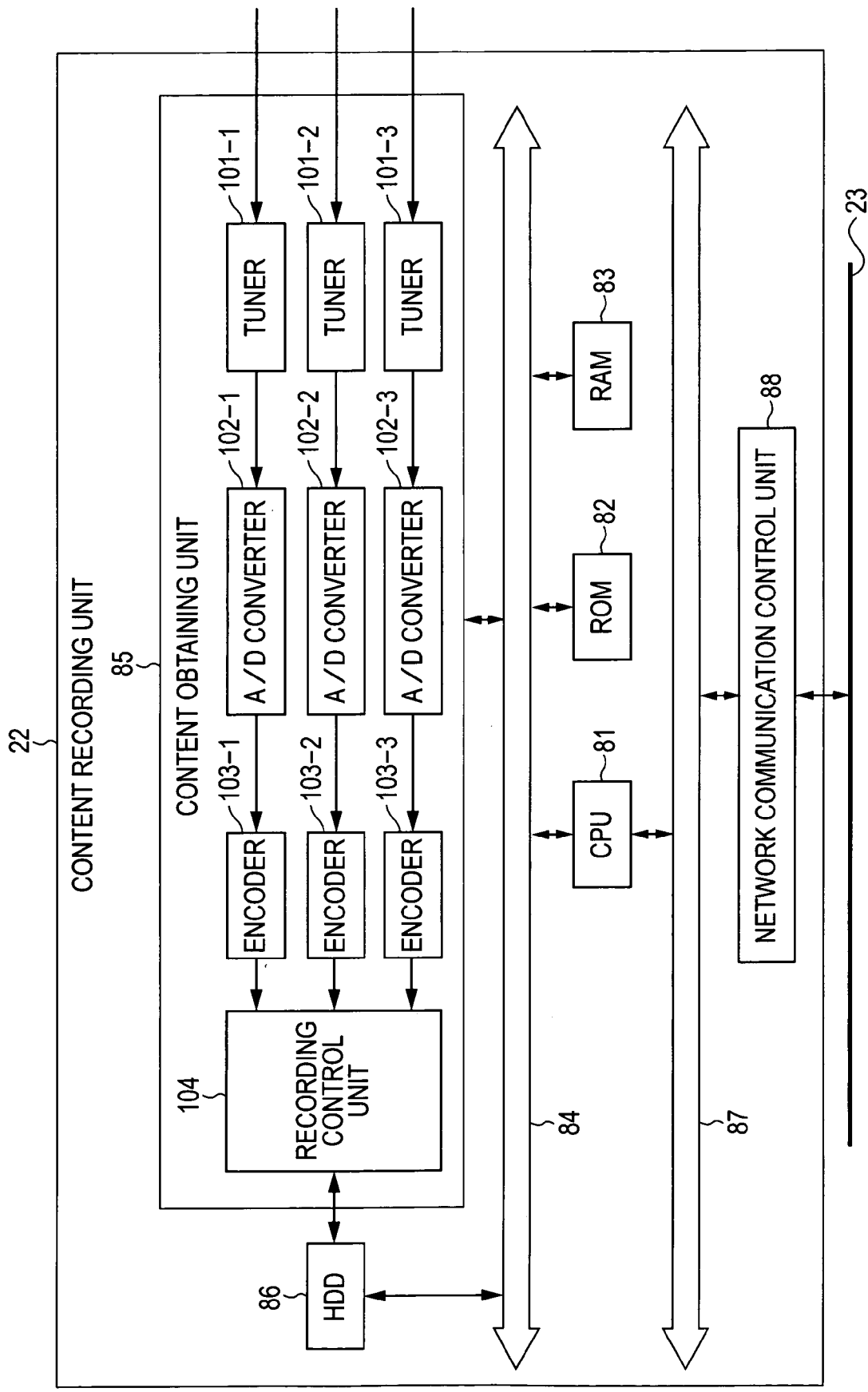
FIG. 3 is a block diagram showing an example of a configuration the content recording unit shown in FIG. 1.

FIG. 3 is a block diagram showing an example of a configuration of the content recording unit 22-1.

In the content recording unit 22-1 (content recording unit 22) shown in FIG. 3, a CPU 81 executes various processes according to a program stored in a ROM 82. Also, the CPU 81 receives a program transmitted from the main control unit 21 shown in FIG. 1 through the network 23 via a network communication control unit 88 and a bus 87 and loads the program onto the RAM 83. The CPU 81 may execute various processes according to the program. The RAM 83 stores data and so on required by the CPU 81 to execute various processes.

The CPU 81, the ROM 82, and the RAM 83 connect to each other through a bus 84. Further, a content obtaining unit 85 and a hard disk drive (HDD) 86 connect to the bus 84.

The content obtaining unit 85 is capable of simultaneously receiving (obtaining) broadcast programs (pieces of content) that are broadcasted by a plurality of broadcast stations in the same time slot. More specifically, in the example shown in FIG. 3, the content obtaining unit 85 is capable of simultaneously receiving three broadcast programs that are broadcasted by three different broadcast stations. That is, the content obtaining unit 85 includes three tuners 101-1 to 101-3, three analog to digital (A/D) converters 102-1 to 102-3, and three encoders 103-1 to 103-3.

Hereinafter, each of the three tuners 101-1 to 101-3 is referred to as a tuner 101 when they need not be distinguished from each other. Likewise, each of the three A/D converters 102-1 to 102-3 is referred to as an A/D converter 102 when they need not be distinguished from each other. Also, each of the three encoders 103-1 to 103-3 is referred to as an encoder 103 when they need not be distinguished from each other.

The tuner 101 decodes television broadcast waves, such as ground waves or satellite waves, received by an antenna (not shown), so as to obtain video and audio signals, and then supplies the signals to the A/D converter 102.

In other words, when the antenna receives broadcast waves of a channel specified by the CPU 81, more precisely, when the antenna receives radio waves of a broadcast program that is broadcasted by a broadcast station to which the channel is assigned, the tuner 101 decodes the broadcast waves into analog video and audio signals, and supplies the signals to the A/D converter 102.

As described above, each broadcast program is actually broadcasted by a broadcast station. In the following description, however, an expression "a broadcast program is broadcasted by a channel (assigned to the broadcast station)" is used in order to simplify the description.

The A/D converter 102 A/D converts the analog video and audio signals supplied from the tuner 101 and supplies digital video and audio signals to the encoder 103. Hereinafter, the digital signals output from the A/D converter 102, that is, digital video and audio signals constituting a predetermined broadcast program are collectively called "content data".

The encoder 103 encodes (by compression encoding) the content data supplied from the A/D converter 102 using an MPEG (Moving Picture Experts Group) method or the like, and supplies the encoded content data to the recording control unit 104. The encoded content data output from the encoder 103 is called "compressed content data".

The recording control unit 104 stores respective pieces of compressed content data supplied from the encoders 103-1 to 103-3 in the HDD 86 in a form of a file.

The recording unit in the HDD 86 is not necessarily one broadcast program. Precisely, the recording unit is a set of broadcasted content of a predetermined channel specified in a recording reservation. The set of broadcasted content can include one or more broadcast programs (it does not necessarily include an entire program but may include only part of a program). Therefore, each file recorded in the HDD 86 may contain one broadcast program broadcasted by a predetermined channel or may contain two or more broadcast programs broadcasted by the channel.

Additionally, program information (metadata) of a recorded broadcast program is also stored in the HDD 86.

In this embodiment, program information to be stored in the HDD 86 is supplied from a server (not shown) connected to the network 23. That is, in this embodiment, the CPU 81 adequately obtains program information of each broadcast program through the network 23 and the network communication control unit 88 and allows the HDD 86 to store the program information.

A method of obtaining the program information is not limited to that of this embodiment and an arbitrary method may be used. For example, the content obtaining unit 85 may extract program information from a vertical blanking period of a television broadcast signal of received ground waves. Alternatively, the content obtaining unit 85 may extract program information from a television broadcast signal of received satellite waves.

The CPU 81 also connects to the bus 87, and the bus 87 connects to the network communication control unit 88. The network communication control unit 88 controls communication with another block (e.g., the main control unit 21 shown in FIG. 1) through the network 23.

The content recording unit 22-2 has the same configuration as that of the content recording unit 22-1, and thus the corresponding description is not repeated. Hereinafter, the configuration shown in FIG. 3 is also used as describing the configuration of the content recording unit 22-2 as necessary.

In the above description, the number of tuners mounted in the PC 1 is six. That is, the three tuners 101-1 to 101-3 are mounted in each of the content recording units 22-1 and 22-2 (see FIG. 3). However, the number of tuners mounted in the PC 1 is not limited to this example and may be arbitrarily set. Further, places where the tuners are provided are not limited. For example, an arbitrary number of tuners may be mounted in the main control unit 21.

Figure 4:
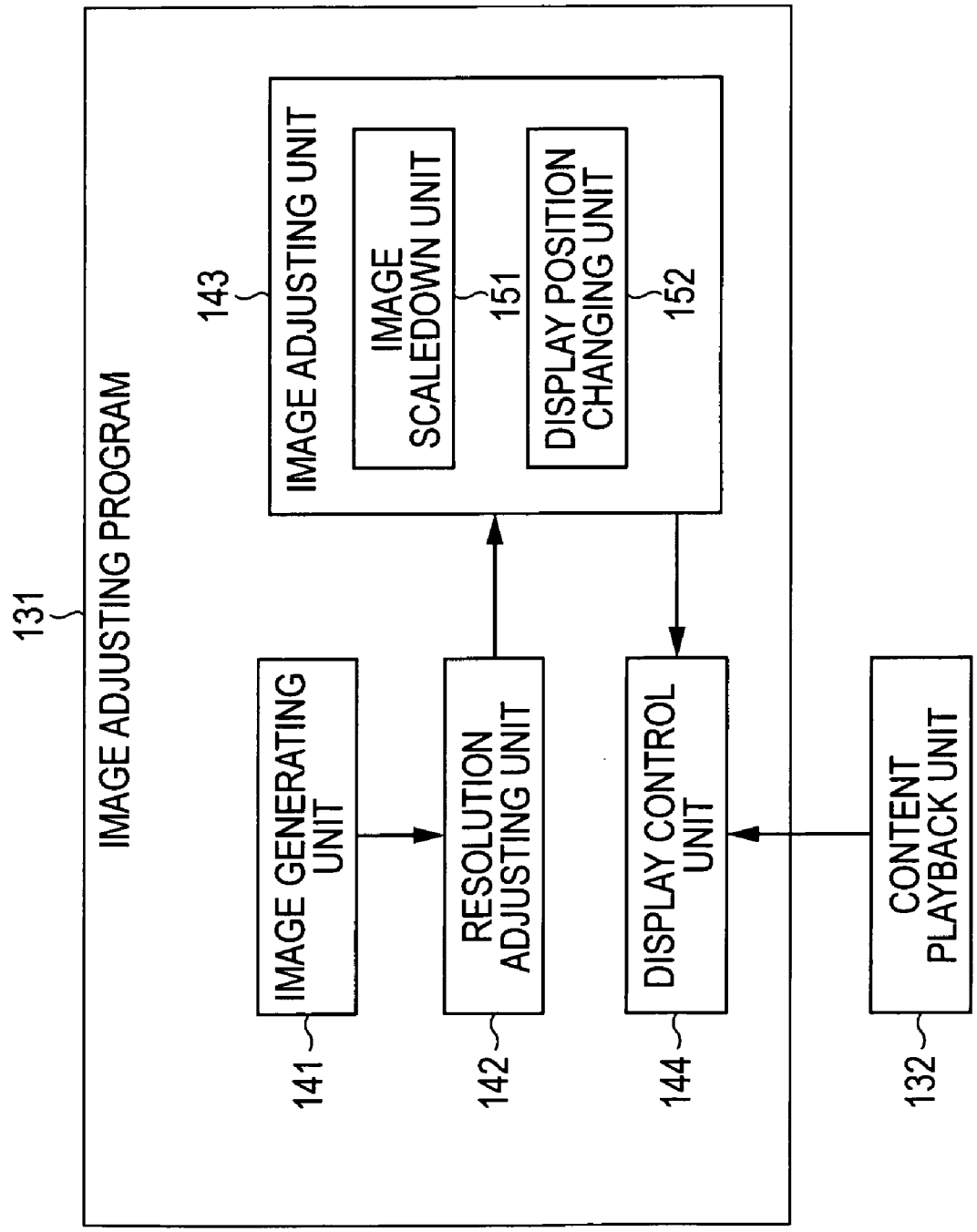
FIG. 4 is a block diagram showing an example of a functional configuration of an image adjusting program executed by the CPU of the main control unit.

FIG. 4 is a block diagram showing an example of a functional configuration of an image adjusting program 131 that is executed by the CPU 51 of the main control unit 21.

The image adjusting program 131 adjusts the size and display position of an image to be displayed in the TV receiver 12.

The image adjusting program 131 includes an image generating unit 141, a resolution adjusting unit 142, an image adjusting unit 143, and a display control unit 144.

A content playback unit 132 plays back various content and supplies the played back content to the image adjusting program 131. More specifically, the content playback unit 132 decodes encoded moving or still images that are recorded (stored) in the storage unit 60 of the main control unit 21 or the HDD 86 of the content recording unit 22 or that are supplied through the network 23 and the communication unit 61, so as to play back the images. Also, the content playback unit 132 supplies the decoded and played back moving or still images to the display control unit 144 of the image adjusting program 131.

The image generating unit 141 generates image data of a GUI (e.g., a GUI image 211 shown in FIG. 7) in response to a signal (instructions from a user) supplied from the input unit 59 by the user. Also, the image generating unit 141 supplies the generated GUI image data to the resolution adjusting unit 142.

The resolution adjusting unit 142 adjusts the resolution of the GUI image data supplied from the image generating unit 141 so that the resolution matches with that of the screen of the TV receiver 12, and supplies the GUI image data whose resolution has been adjusted to the image adjusting unit 143.

The image adjusting unit 143 adjusts the size and display position of an image corresponding to the GUI image data supplied from the resolution adjusting unit 142 and supplies the GUI image data to the display control unit 144.

Also, the image adjusting unit 143 supplies a setting window 261 (described below with reference to FIG. 11) that allows a user to change settings of the size of a safety area on the screen of the TV receiver 12 and a display position to the display control unit 144.

The image adjusting unit 143 includes an image scaledown unit 151 and a display position changing unit 152.

The image scaledown unit 151 scales down the GUI image data supplied from the resolution adjusting unit 142 with a scaledown ratio that is preset according to the safety area of the screen of the TV receiver 12. Also, the image scaledown unit 151 supplies the scaled down GUI image data to the display control unit 144. In other words, the GUI image data is scaled down so that the ratio between the image data output from the image scaledown unit 151 and the image data input to the image scaledown unit 151 is equal to the preset scaledown ratio.

Further, the image scaledown unit 151 changes the scaledown ratio of the GUI image data in response to instructions (setting) of the user and scales down the GUI image data in accordance with the changed scaledown ratio. Then, the image scaledown unit 151 supplies the scaled down GUI image data to the display control unit 144.

The display position changing unit 152 supplies data indicating a change in display position of the GUI image to the display control unit 144 in response to instructions from the user.

The display control unit 144 superimposes the GUI image data supplied from the image adjusting unit 143 onto the image (moving or still image) supplied from the content playback unit 132. In this case, the display control unit 144 superimposes the GUI image data at a display position indicated by the data supplied from the display position changing unit 152 of the image adjusting unit 143.

Further, the display control unit 144 supplies the mixed image, which is generated by superimposing the GUI image onto the image supplied from the content playback unit 132, to the TV receiver 12 and allows the TV receiver 12 to display it. The display control unit 144 also supplies the setting window 261 (see FIG. 11) supplied from the image adjusting unit 143 to the PC monitor 11 and allows the PC monitor 11 to display it.

Now, an image display process executed by the CPU 51 of the main control unit 21 in accordance with the image adjusting program 131 is described with reference to the flowchart shown in FIG. 5. This process starts when the user operates the input unit 59 or the remote control 71 so as to play back a moving or still image.

In step S1, the content playback unit 132 obtains an image to be displayed (played back) from the storage unit 60 or the HDD 86 and plays back the image, in response to a request from a user. For example, the content playback unit 132 obtains a moving image recorded in the HDD 86 and supplies it to the display control unit 144.

In step S2, the image generating unit 141 determines whether the GUI image 211 (described later with reference to FIG. 7) is requested to be displayed on a screen 201 (see FIG. 6) of the TV receiver 12 based on a signal supplied from the input unit 59 or the remote control 71 (infrared receiving unit 58).

When it is determined in step S2 that the GUI image 211 is not requested to be displayed on the screen 201 of the TV receiver 12, the process proceeds to step S3 where the display control unit 144 displays the image that was obtained in step S1 (instructed to be displayed by the user) in the TV receiver 12.

Figure 6:
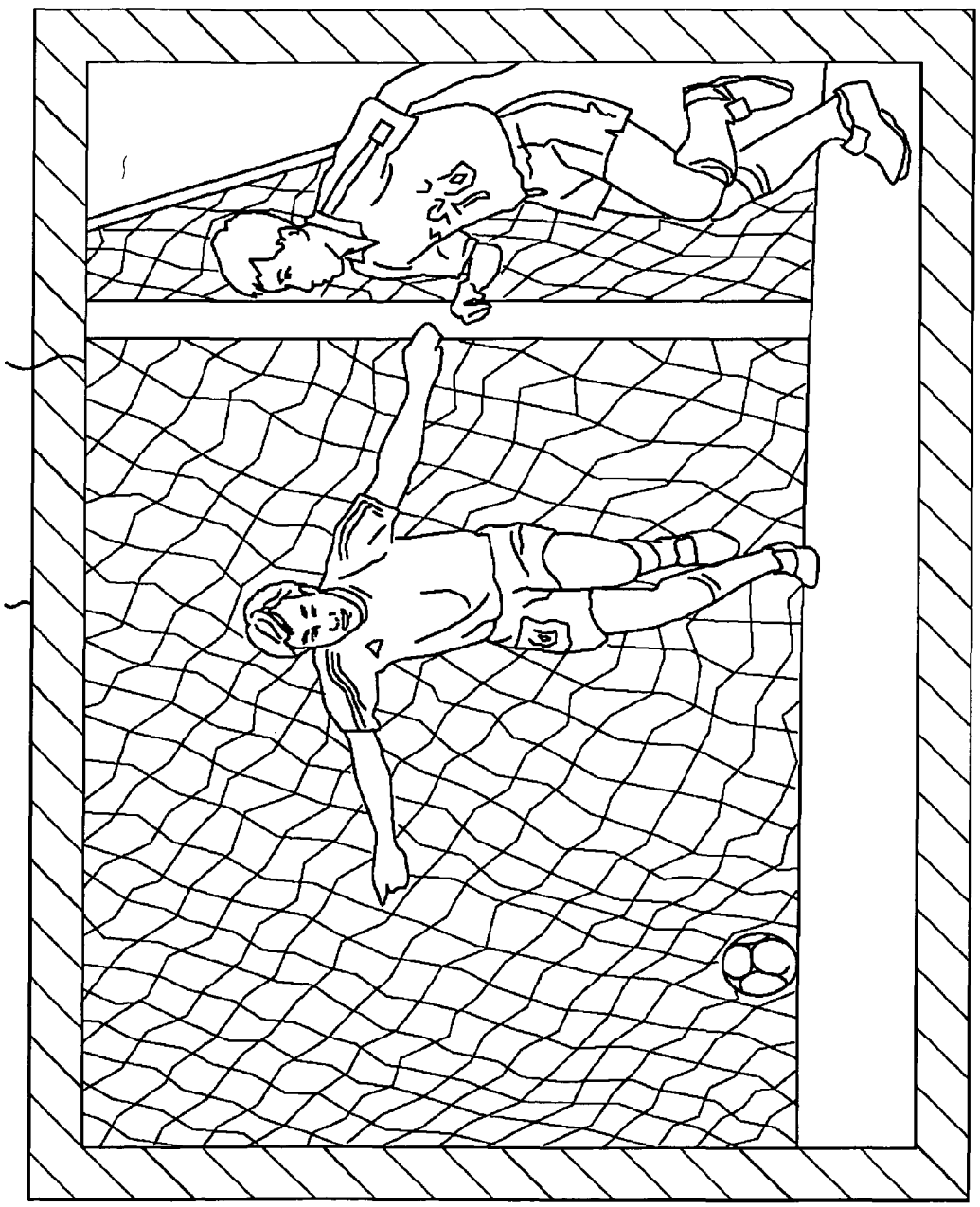
FIG. 6 illustrates a screen and a safety area of a television receiver.

FIG. 6 illustrates the screen 201 of the entire image that is supplied to the TV receiver 12 and a safety area 202 of the screen 201. Herein, when the resolution of the TV receiver 12 is 1920×1080 pixels, the screen 201 corresponds to the entire image, that is, 1920×1080 pixels.

A diagonally shaded area (periphery of the safety area 202) in FIG. 6 is an area where no image is displayed in the TV receiver 12 because an overscan method is used in the TV receiver 12. That is, an image at upper, lower, right, and left edges of the entire screen 201 is not displayed in the TV receiver 12.

In step S3, the TV receiver 12 displays the moving image (a moving image of a soccer game in the example shown in FIG. 6) in the safety area 202 of the screen 201 under control by the display control unit 144.

At this time, the image obtained in step S1 and displayed in step S3 may be a still image instead of the moving image.

After step S3, the process returns to step S1 and the same steps are executed.

When it is determined in step S2 that the GUI image 211 is requested to be displayed in the TV receiver 12, the process proceeds to step S4 where the image generating unit 141 generates image data of the GUI to be displayed in the TV receiver 12.

Figure 7:
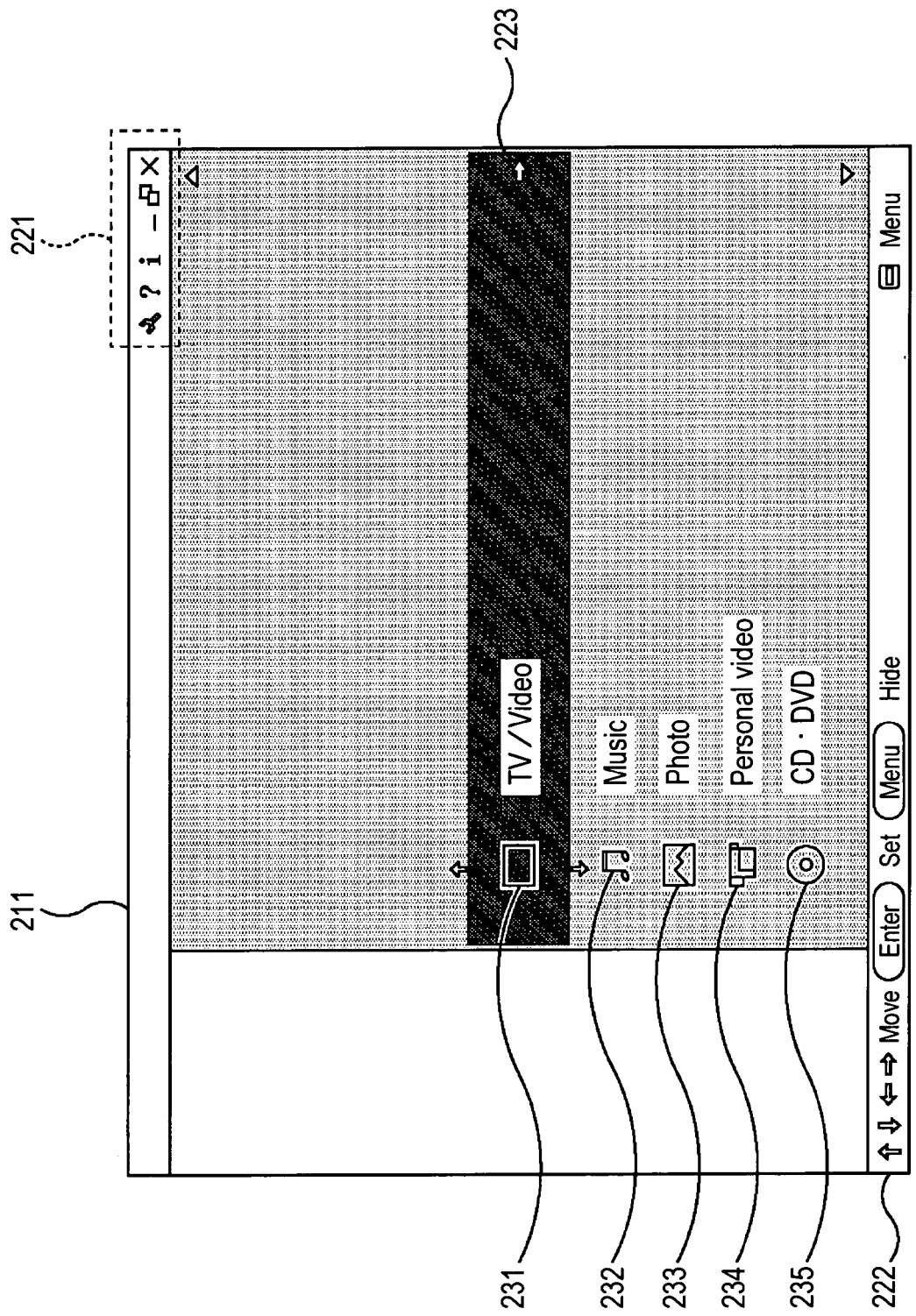
FIG. 7 illustrates an image of a graphical user interface (GUI)

FIG. 7 shows an example of the GUI image 211. Herein, the GUI image 211 is a window that is displayed when a predetermined application program is executed in the PC 1.

An operation display unit 221 at the upper right portion of the GUI image 211 includes a plurality of buttons (icons) used by the user to close the GUI image 211, change the size of the GUI image 211, minimize the GUI image 211, or display a help screen by operating a mouse as the input unit 59 and using a cursor (not shown) displayed on the screen 201. Also, a guidance bar 222 for guiding an operation method using the remote control 71 is displayed at the bottom of the GUI image 211.

Further, an icon selection area 223 is provided in the GUI image 211. The user can execute a function (application program) corresponding to each of icons 231 to 235 by operating the remote control 71 or the like in accordance with the guidance bar 222, so as to move a selected area up and down (in the vertical direction) within the icons 231 to 235 and then select an icon displayed in the icon selection area 223.

For example, when the icon 231 "TV/Video" is selected by the user, an application program of watching an on-air television program, recording a program or making a recording reservation, or generating a digital versatile disk (DVD) is executed. When the icon 232 "Music" is selected, an application program of playing back music data recorded in the storage unit 60 or the HDD 86 is executed. When the icon 233 "Photo" is selected, an application program of capturing a photo (still image data) or playing back a slide show of images recorded in the storage unit 60 or the HDD 86 is executed.

When the icon 234 "Personal video" is selected by the user, an application program of playing back a file of moving image data recorded in the storage unit 60 or the HDD 86 or generating a DVD is executed. When the icon 235 "CD/DVD" is selected, an application program of recording or playing back music data in a compact disc (CD) or playing back video data in a DVD is executed.

Referring back to FIG. 5, in step S5, the resolution adjusting unit 142 adjusts the resolution of the screen 201 of the TV receiver 12. More specifically, in step S5, the resolution adjusting unit 142 recognizes the resolution of the TV receiver 12 based on the terminal provided in the PC 1 and connected to the TV receiver 12, and adjusts (sets) the resolution so that the resolution of the GUI image data generated in step S4 matches with that of the screen 201 of the TV receiver 12.

For example, when the TV receiver 12 connects to a D1 terminal of the PC 1, the total number of scanning lines is 525$i$ and the resolution of the screen 201 of the TV receiver 12 is 720×480 pixels which are effective pixels corresponding to the total number 525$i$ of the scanning lines. Accordingly, the resolution of the GUI image data is adjusted to match with the 720×480 pixels.

When the TV receiver 12 connects to a D2 terminal of the PC 1, the total number of scanning lines is 525$i$ or 525$p$ and the resolution of the screen 201 of the TV receiver 12 is 720×480 pixels which are effective pixels corresponding to the total number 525$i$ of the scanning lines, or 720×480 pixels which are effective pixels corresponding to the total number 525$p$ of the scanning lines. Accordingly, the resolution of the GUI image data is adjusted to match with the 720×480 pixels.

When the TV receiver 12 connects to a D3 terminal of the PC 1, the total number of scanning lines is any of 525$i$, 525$p$, and 1125$i$, and the resolution of the screen 201 of the TV receiver 12 is any of 720×480 pixels which are effective pixels corresponding to the total number 525$i$ of the scanning lines, 720×480 pixels which are effective pixels corresponding to the total number 525$p$ of the scanning lines, and 1920×1080 pixels which are effective pixels corresponding to the total number 1125$i$ of the scanning lines. Accordingly, the resolution of the GUI image data is adjusted to match with the 720×480 pixels or 1920×1080 pixels.

When the TV receiver 12 connects to a D4 terminal of the PC 1, the total number of scanning lines is any of 525$i$, 525$p$, 1125$i$, and 750$p$, and the resolution of the screen 201 of the TV receiver 12 is any of 720×480 pixels which are effective pixels corresponding to the total number 525$i$ of the scanning lines, 720×480 pixels which are effective pixels corresponding to the total number 525$p$ of the scanning lines, 1920×1080 pixels which are effective pixels corresponding to the total number 1125$i$ of the scanning lines, and 1280×720 pixels which are effective pixels corresponding to the total number 750$p$ of the scanning lines. Accordingly, the resolution of the GUI image data is adjusted to match with any of the 720×480 pixels, 1920×1080 pixels, and 1280×720 pixels.

Incidentally, "i" in the above-described 525$i$ and 1125$i$ means that an interlace method is used for scanning, and "p" in the 525$p$ and 750$p$ means that a progressive method is used for scanning.

In step S6, the image scaledown unit 151 reduces the area (size) of the GUI image data based on the size of the safety area 202 relative to the image data in the TV receiver 12. That is, the image scaledown unit 151 scales down the GUI image data with a scaledown ratio that is preset in accordance with the safety area 202 relative to the entire screen 201 in the TV receiver 12.

The scaledown ratio that is preset in accordance with the safety area 202 is set so that the size of the GUI image 211 is the same as or smaller than that of the safety area 202.

For example, when the GUI image 211 that is displayed over the entire screen 201 is 100%, the scaledown ratio is set to 80%.

In step S7, the display control unit 144 superimposes the GUI image data that was scaled down in step S6 onto the image obtained in step S1. That is, as shown in FIG. 8, the GUI image 211 shown in FIG. 7 that was scaled down in step S6 is superimposed on the moving image displayed in the safety area 202 shown in FIG. 6.

Figure 8:
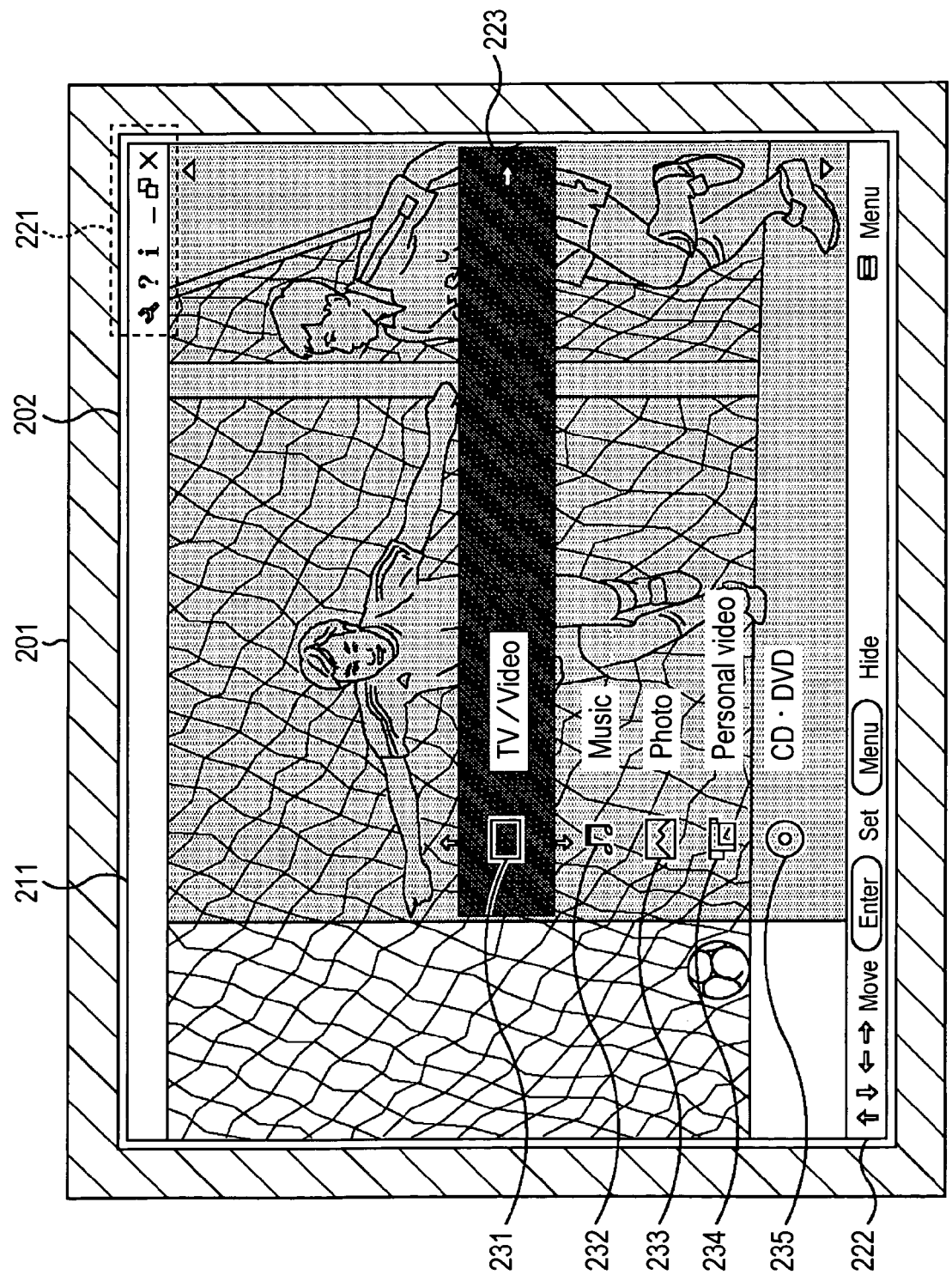
FIG. 8 illustrates an image of the GUI displayed in the television receiver while the safety area is considered.

In FIG. 8, the GUI image 211 is smaller than the safety area 202. Alternatively, the GUI image 211 may be displayed after being scaled down to the same size as that of the safety area 202.

After step S7, the process proceeds to step S3 where the TV receiver 12 displays the image 211 corresponding to the GUI image data that was superimposed in step S7 under control by the display control unit 144.

Not only the GUI image 211 (GUI image data) but also various still or moving images can be scaled down with a preset scaledown ratio in accordance with the safety area 202.

As described above, by reducing the size of an image generated by the application program executed in the PC 1 to a size that is the same as or smaller than that of the safety area 202 of the TV receiver 12, the entire image generated by the application program executed in the PC 1 can be displayed on the screen 201 of the TV receiver 12 as in the PC monitor 11.

Accordingly, an inconvenience caused during execution of the application program on the screen 201 of the TV receiver 12: an undesired state where the periphery of the GUI image 211, in which GUIs including icons are placed at upper, lower, right, and left edges, cannot be seen from the user, can be prevented. As a result, the user can operate an apparatus such as the PC 1 more easily.

The following are advantages of the embodiment of the present invention.

Figure 9:
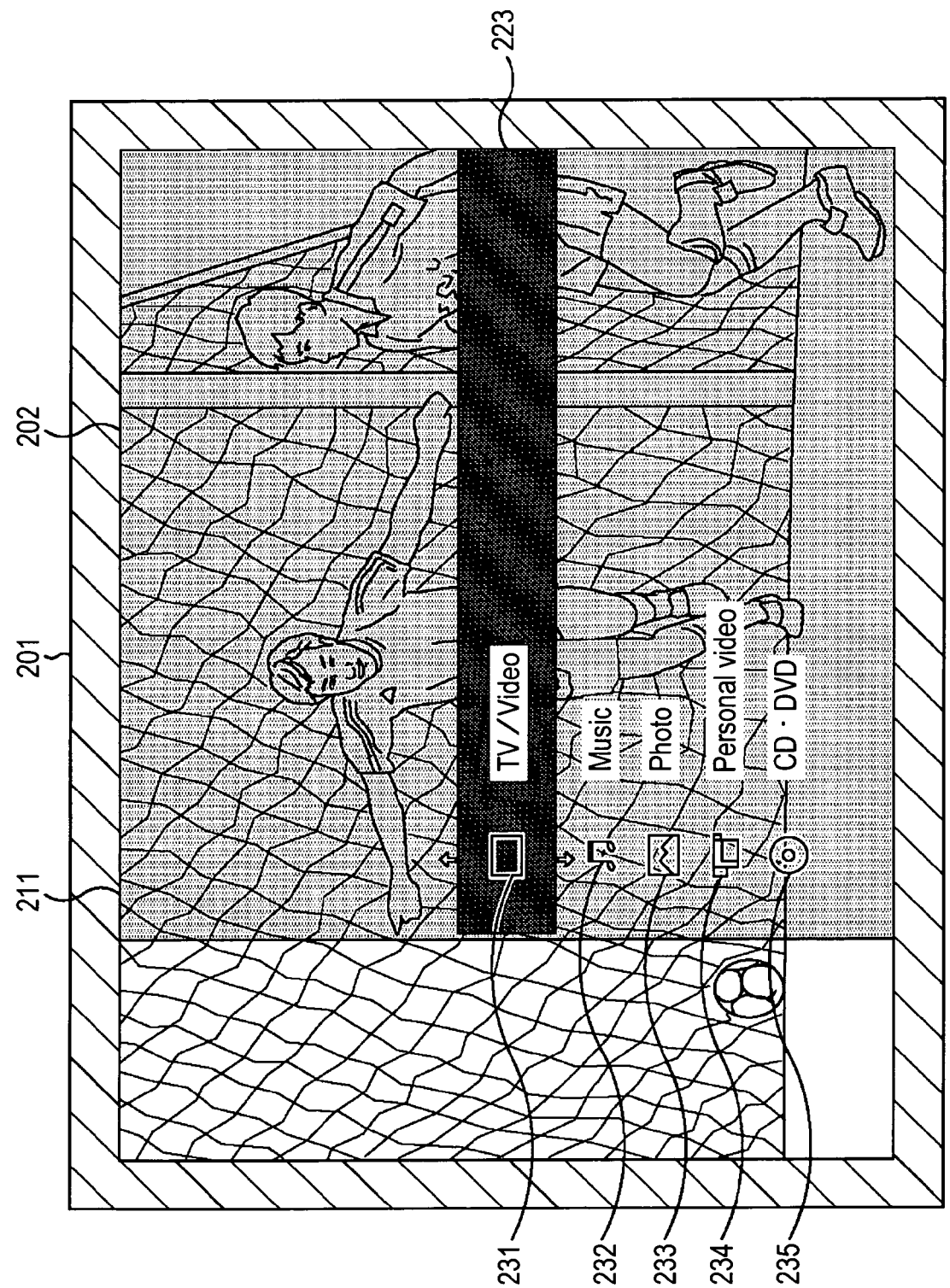
FIG. 9 illustrates an image of the GUI displayed in the television receiver while the safety area is not considered.

FIG. 9 shows an example where the GUI image 211 is displayed on the screen 201 of the TV receiver 12 without reducing the size of the GUI image data.

As shown in FIG. 9, not entire part of the GUI image 211 is displayed, that is, the GUI image 211 is displayed only in the range of the safety area 202, because an overscan method is used in the TV receiver 12 unlike in the PC monitor 11 that uses an underscan method. In other words, the upper, lower, right, and left edges of the GUI image 211, e.g., the operation display unit 221 and the guidance bar 222 are hidden.

Therefore, neither the operation display unit 221 nor the guidance bar 222 may be used on the screen 201 of the TV receiver 12 shown in FIG. 9, so that an inconvenience occurs when the user wants to operate the GUI image 211.

In order to overcome this inconvenience, according to an embodiment of the present invention, the size of the GUI image 211 is reduced to a size that is the same as or smaller than that of the safety area 202. Accordingly, the operation display unit 221 and the guidance bar 222 are displayed in the safety area 202 of the screen 201 as shown in FIG. 8, so that the inconvenience caused when the user operates the GUI image 211 can be prevented.

As described above, according to the embodiment of the present invention, the entire image can be displayed and the operability of the apparatus can be enhanced.

Next, a process of setting a GUI (the GUI image 211) executed by the CPU 51 of the main control unit 21, which executes the image adjusting program 131, is described with referent to the flowchart shown in FIG. 10. This process starts when a user operates the input unit 59 or the remote control 71 to provide instructions to display the setting window 261 (see FIG. 11) where the user can set (change) the size and display position of the GUI image 211 in the safety area 202 of the screen 201 of the TV receiver 12.

In step S31, the image adjusting unit 143 allows the PC monitor 11 to display the setting window 261 of the GUI image 211 through the display control unit 144.

Figure 11:
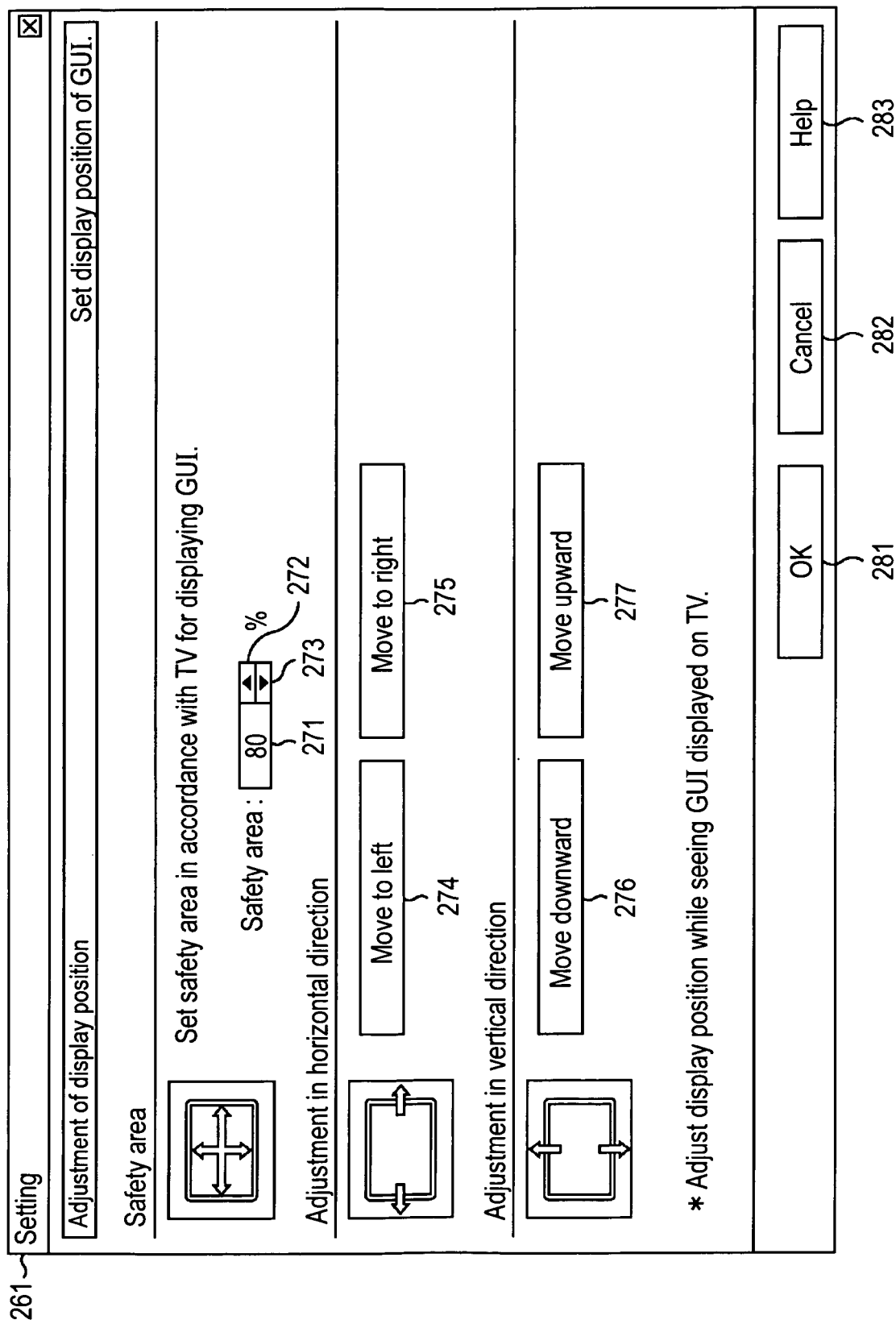
FIG. 11 illustrates an example of a setting window of the GUI.

FIG. 11 shows an example of the setting window 261.

The setting window 261 is provided with a menu 271 where the present scaledown ratio of the GUI image 211 relative to the entire screen 201 (100%) of the TV receiver 12 is displayed, an increment button 272, and a decrement button 273.

Although "Safety area" is displayed on the left of the menu 271, the value displayed in the menu 271 indicates the scaledown ratio of the GUI image 211 (in the example shown in FIG. 11, the menu 271 indicates 80%).

Also, the setting window 261 is provided with buttons 274 and 275 for adjusting the position in the horizontal direction of the GUI image 211 on the screen 201 and also with buttons 276 and 277 for adjusting the position in the vertical direction of the GUI image 211 on the screen 201.

Further, the setting window 261 is provided with an OK button 281, a cancel button 282, and a help button 283.

In step S32, the image adjusting unit 143 determines whether instructions to change the scaledown ratio of the GUI image 211 have been provided in the setting window 261 based on a signal supplied from the input unit 59.

When it is determined in step S32 that instructions to change the scaledown ratio of the GUI image 211 have been provided in the setting window 261, that is, when the user operates the increment button 272 or the decrement button 273 by using a mouse as the input unit 59, the process proceeds to step S33 where the image scaledown unit 151 changes the size of the GUI image 211 in the TV receiver 12 based on the changed scaledown ratio (displayed in the menu 271).

At this time, the user operates the setting window 261 displayed on the screen of the PC monitor 11 by using the mouse as the input unit 59 while seeing the GUI image 211 displayed in the safety area 202 of the screen 201 of the TV receiver 12 shown in FIG. 8.

When the increment button 272 in the setting window 261 displayed on the PC monitor 11 is clicked (pressed) by the user, the value (scaledown ratio) indicated in the menu 271 is incremented by 1 (1%), so that the GUI image 211 displayed on the screen 201 of the TV receiver 12 is scaled down with the set scaledown ratio that is incremented by 1%.

Conversely, when the decrement button 273 is clicked (pressed), the value indicated in the menu 271 is decremented by 1 (1%), so that the GUI image 211 displayed on the screen 201 of the TV receiver 12 is scaled down with the scaledown ratio that is decremented by 1%.

Figure 5:
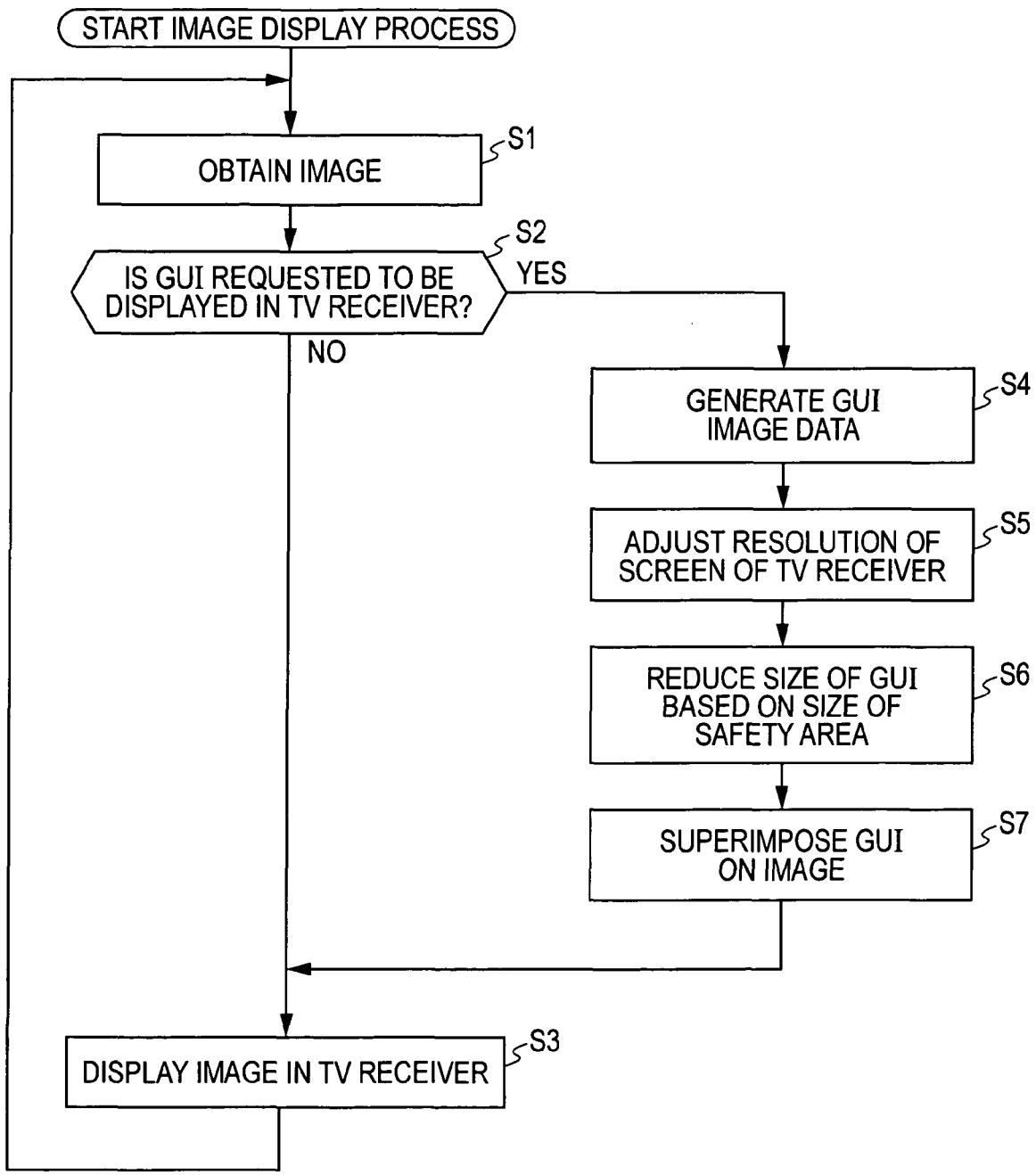
FIG. 5 is a flowchart illustrating an image display process.

In other words, in step S33, the GUI image 211 (image data of the GUI) that was scaled down with the changed scaledown ratio is superimposed on the image obtained in step S1 of FIG. 5 and is output to the TV receiver 12 under control by the image scaledown unit 151 and the display control unit 144.

When it is determined in step S32 that instructions to change the scaledown ratio of the GUI image 211 have not been provided, step S33 is skipped and the process proceeds to step S34.

In step S34, the image adjusting unit 143 determines whether instructions to change the display position in the horizontal direction of the GUI image 211 have been provided in the setting window 261.

When it is determined in step S34 that instructions to change the display position in the horizontal direction of the GUI image 211 have been provided, that is, when the button 274 or 275 is operated by the user, the process proceeds to step S35 where the display position changing unit 152 changes the display position in the horizontal direction of the GUI 211 in the TV receiver 12.

At this time, the user operates the setting window 261 displayed on the screen of the PC monitor 11 by using the mouse as the input unit 59 while seeing the GUI image 211 displayed in the safety area 202 of the screen 201 of the TV receiver 12 shown in FIG. 8.

When the user clicks (presses) the button 274 "Move to left" in the setting window 261, the GUI image 211 is moved to the left by a predetermined length (a predetermined number of pixels). Likewise, when the user clicks the button 275 "Move to right", the GUI image 211 is moved to the right by a predetermined length (a predetermined number of pixels).

Specifically, the display position changing unit 152 supplies data indicating the position of the GUI image 211 to be superimposed on the image obtained in step S1 of FIG. 5, the position being adjusted by an operation of the button 274 or 275, to the display control unit 144.

The display control unit 144 superimposes the GUI image 211 on the image obtained in step S1 at the position indicated by the data supplied from the display position changing unit 152.

In other words, in step S35, the GUI image 211 whose display position in the horizontal direction on the screen 201 is changed is superimposed on the image obtained in step S1 of FIG. 5 and is output to the TV receiver 12 under control by the display position changing unit 152 and the display control unit 144.

When it is determined in step S34 that instructions to change the display position in the horizontal direction of the GUI image 211 have not been provided in the setting window 261, step S35 is skipped and the process proceeds to step S36.

In step S36, the image adjusting unit 143 determines whether instructions to change the display position in the vertical direction of the GUI image 211 have been provided in the setting window 261.

When it is determined in step S36 that instructions to change the display position in the vertical direction of the GUI image 211 have been provided, that is, when the button 276 or 277 is operated by the user, the process proceeds to step S37 where the display position changing unit 152 changes the display position in the vertical direction of the GUI 211 in the TV receiver 12.

At this time, the user operates the setting window 261 displayed on the screen of the PC monitor 11 by using the mouse as the input unit 59 while seeing the GUI image 211 displayed in the safety area 202 of the screen 201 of the TV receiver 12 shown in FIG. 8.

When the user clicks (presses) the button 276 "Move downward" in the setting window 261, the GUI image 211 is moved downward by a predetermined length (a predetermined number of pixels). Likewise, when the user clicks the button 277 "Move upward", the GUI image 211 is moved upward by a predetermined length (a predetermined number of pixels).

Specifically, the display position changing unit 152 supplies data indicating the position of the GUI image 211 to be superimposed on the image obtained in step S1 of FIG. 5, the position being adjusted by operating the button 276 or 277, to the display control unit 144.

The display control unit 144 superimposes the GUI image 211 on the image obtained in step S1 at the position indicated by the data supplied from the display position changing unit 152.

In other words, in step S37, the GUI image 211 whose display position in the vertical direction on the screen 201 is changed is superimposed on the image obtained in step S1 of FIG. 5 and is output to the TV receiver 12 under control by the display position changing unit 152 and the display control unit 144.

When it is determined in step S36 that instructions to change the display position in the vertical direction of the GUI image 211 have not been provided in the setting window 261, step S37 is skipped and the process proceeds to step S38.

In step S38, the image adjusting unit 143 determines whether the user has pressed (clicked) the OK button 281 by operating the mouse as the input unit 59. When it is determined in step S38 that the OK button 281 has been pressed, the process proceeds to step S39 where the image adjusting unit 143 sets the present size of the GUI image 211 (scaledown ratio indicated in the menu 271) and the present display position as defaults.

The cancel button 282 is used to initialize the scaledown ratio and adjustment in horizontal and vertical directions of the GUI image 211. The help button 283 is used to display a help menu showing the details of a method for operating the setting window 261.

After step S39, the process ends.

When it is determined in step S38 that the OK button 281 has not been pressed, the process returns to step S31 and the above-described steps are repeated.

In the above-described embodiment, a D terminal is used as the terminal provided in the display control unit 56 of the PC 1 and connecting the PC1 and the TV receiver 12. However, the present invention is not limited to the D terminal and other various types of terminals may be used. For example, a component terminal, a high-definition multimedia interface (HDMI) terminal, or a DVI terminal may be provided in the PC 1 so as to connect the PC 1 and the TV receiver 12.

As described above, the user can set (adjust) the size and display position of the GUI image 211 displayed in the TV receiver 12 by operating the setting window 261 displayed on the PC monitor 11 of the PC 1 while seeing the GUI image 211 displayed in the TV receiver 12.

That is, the user can set display of an image to be displayed in the TV receiver 12 by operating the PC 1 instead of directly operating the TV receiver 12. Therefore, the user does not need to operate both the PC 1 and the TV receiver 12 in order to display an image output from the PC 1 in the TV receiver 12. Accordingly, the operability of the apparatus enhances and the user can easily operate settings to display an image output from the PC 1 in the TV receiver 12.

The display control apparatus according to the embodiment of the present invention is not limited to the PC 1 shown in FIG. 1, and any display control apparatus can be used as long as recording and reading of a recording medium can be controlled therein. Specifically, a personal digital assistant (PDA) or a mobile phone can be adopted.

As describe above, a display area for displaying an image can be widened or increased by connecting a PC to two or more display devices and displaying an image therein. Further, by reducing the size of the image based on a scaledown ratio that is preset in accordance with the size of a display range relative to the entire image and controlling display of the scaled down image on the display device, the entire part of the image can be displayed on a screen of a TV receiver having a safety area.

The above-described series of processes can be executed by either hardware or software. When the series of processes are executed by software, a program constituting the software is installed from a recording medium into a computer incorporated in a dedicated hardware or a general-purpose personal computer that can execute various functions after being installed with various programs.

An Example of this recording medium includes a package medium that is distributed to provide a program to a user and that contains a program, e.g., a magnetic disk (including a flexible disk), an optical disk (including a compact disk read only memory (CD-ROM) and a digital versatile disk (DVD)), a magneto-optical disk (including a Mini Disc (trade mark) (MD)), or a semiconductor memory, such as the removable recording medium 63 shown in FIG. 2. Also, a read only memory (ROM) or a hard disk that is provided to a user while being incorporated in a computer and that contains a program may be used.

The program for executing the above-described series of processes can be installed to a computer through a wired or wireless communication medium, such as a local area network, the Internet, or digital satellite broadcasting, via an interface such as a router or a modem as necessary.

In this specification, the steps describing the program stored in the recording medium may be executed in time series according to the described order. Alternatively, the steps may be executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A dual display control apparatus for controlling display in a first display device of both overscanned and underscanned images, the first display device displaying a predetermined display range of an entire overscanned supplied image, the dual display control apparatus comprising:
   a processor;
   image scaledown means for scaling down a first underscanned image of a graphical user interface, displayed on a second display device connected to the dual display control apparatus, based on a scaledown ratio recognized based on a terminal connection between the first display device and the dual display control apparatus, and in correspondence with the predetermined display range displayed on the first display device;
   playback means for playing back contents data corresponding to the overscanned images;
   superimpose means for superimposing said downscaled first underscanned image on a second overscanned image of said contents data; and
   display control means for controlling supply of said second overscanned image to said first display device in accordance with a user setting.

2. The dual display control apparatus according to claim 1, wherein the image scaledown means changes the scaledown ratio of the first underscanned image in accordance with a setting of a user.

3. The dual display control apparatus according to claim 2, further comprising:
   position changing means for changing a position of the first underscanned image to be superimposed on the second overscanned image in accordance with a further setting of a user.

4. The dual display control apparatus according to claim 3, wherein the display control means further controls display of a setting image that is displayed to an operably linked second display device other than the first display device and that allows the user to set the scaledown ratio and the position of the first underscanned image to be superimposed on the second overscanned image.

5. A dual display control method in a display control apparatus for controlling display in a first display device of both overscanned and underscanned images, the first display device displaying a predetermined display range of an entire overscanned supplied image, the dual display control method comprising:
   scaling down an underscanned image of a graphical user interface, displayed on a second display device connected to the display control apparatus, based on a scaledown ratio recognized based on a terminal connection between the first display device and the dual display control apparatus, and in correspondence with the predetermined display range displayed on the first display device;
   reproducing contents data corresponding to the overscanned images;
   superimposing said downscaled first underscanned image on a second overscanned image of said contents data; and
   controlling supply of said second overscanned image to said first display device in accordance with a user setting.

6. A non-transitory computer readable recording medium including a computer-readable program for causing a processor to control the display in a first dual display device that displays a predetermined display range of an entire supplied image, the program comprising:
   scaling down an underscanned image of a graphical user interface, displayed on a second display device connected to the display control apparatus, based on a scaledown ratio recognized based on a terminal connection between the first display device and the dual display control apparatus, and in correspondence with the predetermined display range displayed on the first display device;
   reproducing contents data corresponding to the overscanned images;
   superimposing said downscaled first underscanned image on a second overscanned image of said contents data; and
   controlling supply of said second overscanned image to said first display device in accordance with a user setting.

7. A dual display control apparatus for controlling display in a first display device of both overscanned and underscanned images, the first display device displaying a predetermined display range of an entire overscanned supplied image, the dual display control apparatus comprising:
   a processor;
   an image scaledown unit adapted to scale down a first underscanned image of a graphical user interface, displayed on a second display device connected to the dual display control apparatus, based on a scaledown ratio recognized based on a terminal connection between the first display device and the dual display control apparatus, and in correspondence with the predetermined display range displayed on the first display device;
   a playback unit configured to play back contents data corresponding to the overscanned images;
   a superimpose unit configured to superimpose said downscaled first underscanned image on a second overscanned image of said contents data; and
   a display control unit configured to control supply of said second overscanned image or said superimpose second image to said first display device in accordance with a user setting.

* * * * *